(12) United States Patent
Voyatzakis et al.

(10) Patent No.: US 8,512,026 B1
(45) Date of Patent: Aug. 20, 2013

(54) DOUGH SHEETER WITH INTEGRAL DOUGH DOCKER

(75) Inventors: Andrew D. Voyatzakis, Carlisle, MA (US); George Athanasiadis, Lexington, MA (US)

(73) Assignee: Somerset Industries, Inc., North Billerica, MA (US)

( * ) Notice: Subject to any disclaimer, the term of this patent is extended or adjusted under 35 U.S.C. 154(b) by 0 days.

(21) Appl. No.: 13/301,661

(22) Filed: Nov. 21, 2011

Related U.S. Application Data

(60) Provisional application No. 61/415,500, filed on Nov. 19, 2010.

(51) Int. Cl.
*B29C 55/18* (2006.01)

(52) U.S. Cl.
USPC ............ 425/290; 425/308; 425/374; 425/194

(58) Field of Classification Search
USPC ................. 425/290, 291, 308, 363, 367, 372, 425/373, 374, 194, 328, 182, 189; 426/517
See application file for complete search history.

(56) References Cited

U.S. PATENT DOCUMENTS

| | | | |
|---|---|---|---|
| 33,033 A | 8/1861 | Exton | |
| 550,337 A | 11/1895 | Wolff et al. | |
| 730,124 A | 6/1903 | Hugunin et al. | |
| 819,772 A | 5/1906 | Latham | |
| 1,807,009 A | 5/1931 | Pinnelli | |
| 2,309,543 A | 1/1943 | Sawyer | |
| 3,451,358 A * | 6/1969 | Ruiz | 425/290 |
| 4,255,106 A * | 3/1981 | Anetsberger et al. | 425/152 |
| 4,395,216 A * | 7/1983 | Anetsberger et al. | 425/290 |
| 4,573,388 A | 3/1986 | Sullivan et al. | |
| 4,718,769 A | 1/1988 | Conkey | |
| 6,149,959 A | 11/2000 | Dayley et al. | |

* cited by examiner

*Primary Examiner* — Joseph S Del Sole
*Assistant Examiner* — Lawrence D Hohenbrink, Jr.
(74) *Attorney, Agent, or Firm* — Altman & Martin; Steven K Martin

(57) ABSTRACT

The present invention is a dough sheeter with integral dough docker. The dough docker is a removable assembly with a docker subassembly and a scraper subassembly. The docker subassembly includes the docker roller and grate. The docker sprocket, driven by the sheeter motor, has a disk that meshes with a complimentary disk on the docker roller. The scraper subassembly includes the scraper, the backer attached to the scraper, and the gap adjuster, which includes a semicircular shaft that abuts the backer, a rectangular shaft attached to the scraper, and a threaded rod extending from the semicircular shaft through a hole in the scraper and a threaded hole in the rectangular shaft. The gap is adjusted by turning the rod in or out of the threaded hole.

5 Claims, 9 Drawing Sheets

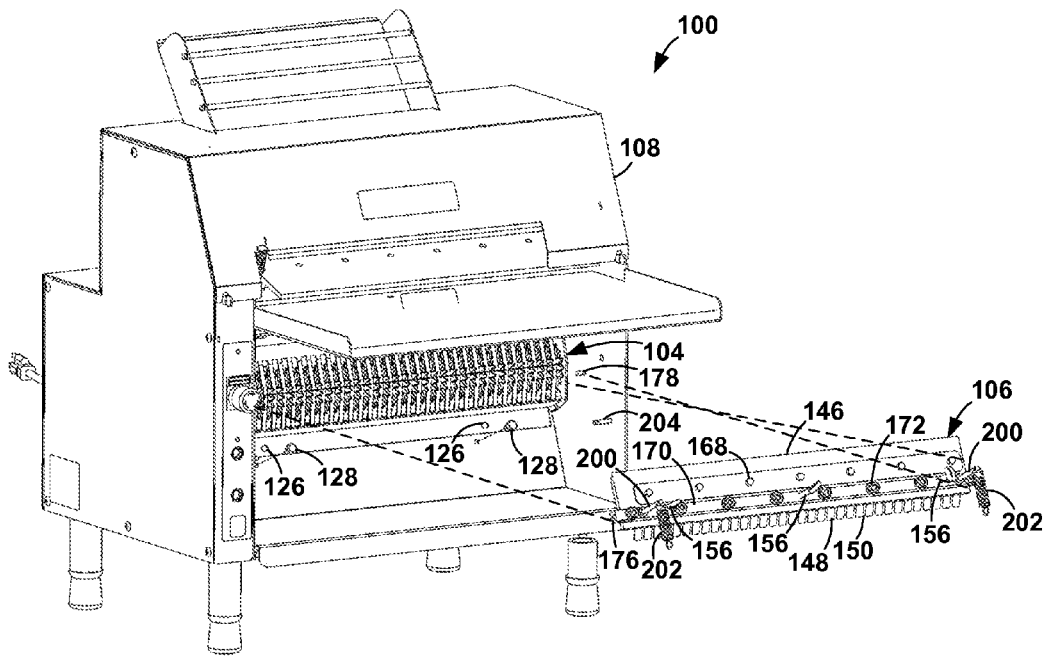
FIG. 7
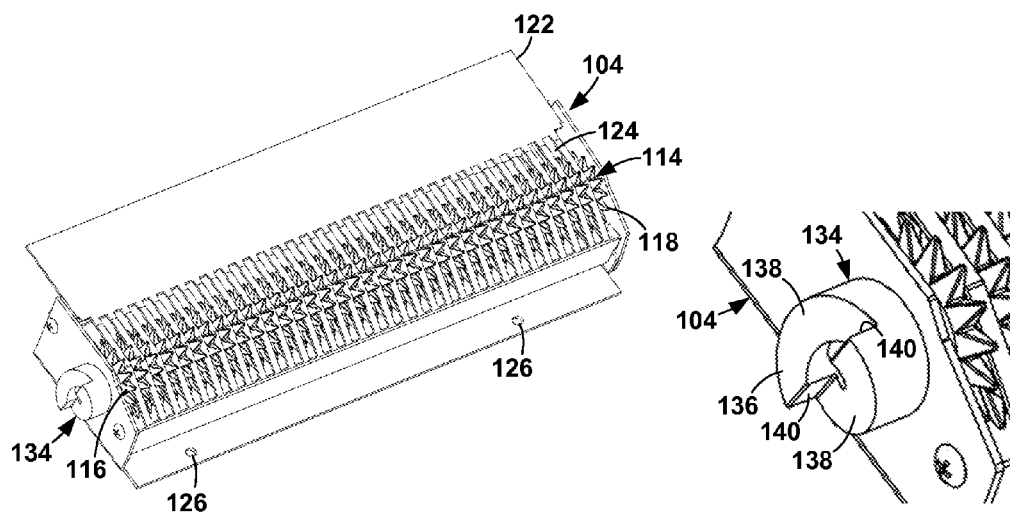
FIG. 8  FIG. 9

DOUGH SHEETER WITH INTEGRAL DOUGH DOCKER

CROSS-REFERENCES TO RELATED APPLICATIONS

The present application claims the benefit of and priority to U.S. Provisional Patent Application No. 61/415,500, filed on Nov. 19, 2010 for title DOUGH SHEETER WITH INTEGRAL DOUGH DOCKER in the names of Andrew Voyatzakis and George Athanasiadis, and is hereby incorporated by reference in its entirety.

STATEMENT REGARDING FEDERALLY SPONSORED RESEARCH OR DEVELOPMENT

Not Applicable

REFERENCE TO A SEQUENCE LISTING, A TABLE, OR A COMPUTER PROGRAM LISTING COMPACT DISK APPENDIX

Not Applicable

BACKGROUND OF THE INVENTION

1. Field of the Invention

The present invention relates to baking, more particularly, to processing dough.

2. Description of the Related Art

In the preparation of dough, such as pizza dough, it is advantageous to deaerate the dough. Various devices have been disclosed for such purposes, typical examples being shown in U.S. Pat. Nos. 550,337; 730,124; 819,772; and 1,807,009.

Devices known as "dough dockers" may be used to deaerate dough. A dough docker typically consists of a cylindrical body, like a rolling pin, with radially-extending teeth or projections for perforating the dough in a predetermined manner to aid in the removal of air. With a manually operated rolling pin-type device, inconsistencies in the deaerating process will occur if the operator is not careful to insure uniform rolling throughout the length of the dough. If one end of the rolling pin rotates faster than the other end, an unequal stretching of the dough will occur which may cause a tear or other imperfection. If the pressure on the rolling pin varies, the dough is compressed in spots, resulting in a non-uniform thickness.

U.S. Pat. No. 4,395,216 discloses a dough sheeter with an integral docker. The docker is driven by a belt that drives the sheeter system. The problem with this arrangement is that the docker will always operate at the same speed relative to the sheeter. This is a problem when handling doughs of different thicknesses and/or consistencies. It is preferable to have a docker with a speed that can be adjusted relative to that of the sheeter. Also, the gap through which the dough travels past the docker can be adjusted, but the adjustment is very inconvenient.

BRIEF SUMMARY OF THE INVENTION

The present invention is a dough sheeter with integral dough docker in two embodiments. The first embodiment separates the docker drive mechanism from the sheeter driver mechanism and provides a convenient gap adjustment. The second embodiment provides a removable docker assembly with a convenient gap adjustment.

In the first embodiment, a sheeter motor drives the chain or belt that rotates only the sheeter rollers. A separate docker motor directly drives the docker roller. The speed of the docker motor can be adjusted independently of the speed of the sheeter motor.

Also in the first embodiment, each end of the docker backer is mounted to one end of a pivoting key. A pin extending from the housing fits into a curved slot at the other end of the key. The pin limits how much the key can pivot. The gap is adjusted by pivoting the key.

In the second embodiment, the dough docker is a removable assembly with a docker subassembly and a scraper subassembly. The docker subassembly includes the docker roller and grate. The docker roller has a plurality of docker wheels with docker pins extending from the circumference thereof. The grate includes a plurality of parallel slots that are aligned with the docker wheels and through which the docker pins extend.

The docker sprocket, which is driven by the sheeter motor, has a drive disk. The docker roller has a mating docker disk. The free ends of both disks have half-spiral surfaces with shoulders. When the docker subassembly is installed, the half-spiral surfaces mesh and the shoulders abut each other so that when the docker sprocket is rotated by the sheeter motor, the docker roller rotates.

The scraper subassembly includes the third roller scraper, the backer attached to the scraper, and the gap adjuster. The gap adjuster includes a semicircular shaft that abuts the backer, a rectangular shaft attached to the scraper, and a threaded rod extending from the shaft through a hole in the scraper and a threaded hole in the rectangular shaft. The gap is adjusted by turning the rod in or out of the threaded hole.

The scraper subassembly mounts to the housing by inverted-U-shaped grooves at the ends of the rectangular shaft that fit over pins extending from the housing. Coil springs bias the scraper against the lower sheeter roller.

BRIEF DESCRIPTION OF THE DRAWINGS

For a fuller understanding of the nature and object of the present invention, reference is made to the accompanying drawings, wherein:

FIG. 7 is a perspective view of the sheeter of FIG. 5 showing the dough docker assembly partially disassembled;

FIG. 8 is a perspective view of the docker subassembly of the embodiment of FIG. 5;

FIG. 9 is a close-up view of the drive mechanism of the docker subassembly of FIG. 8;

DETAILED DESCRIPTION OF THE INVENTION

Figure 1:
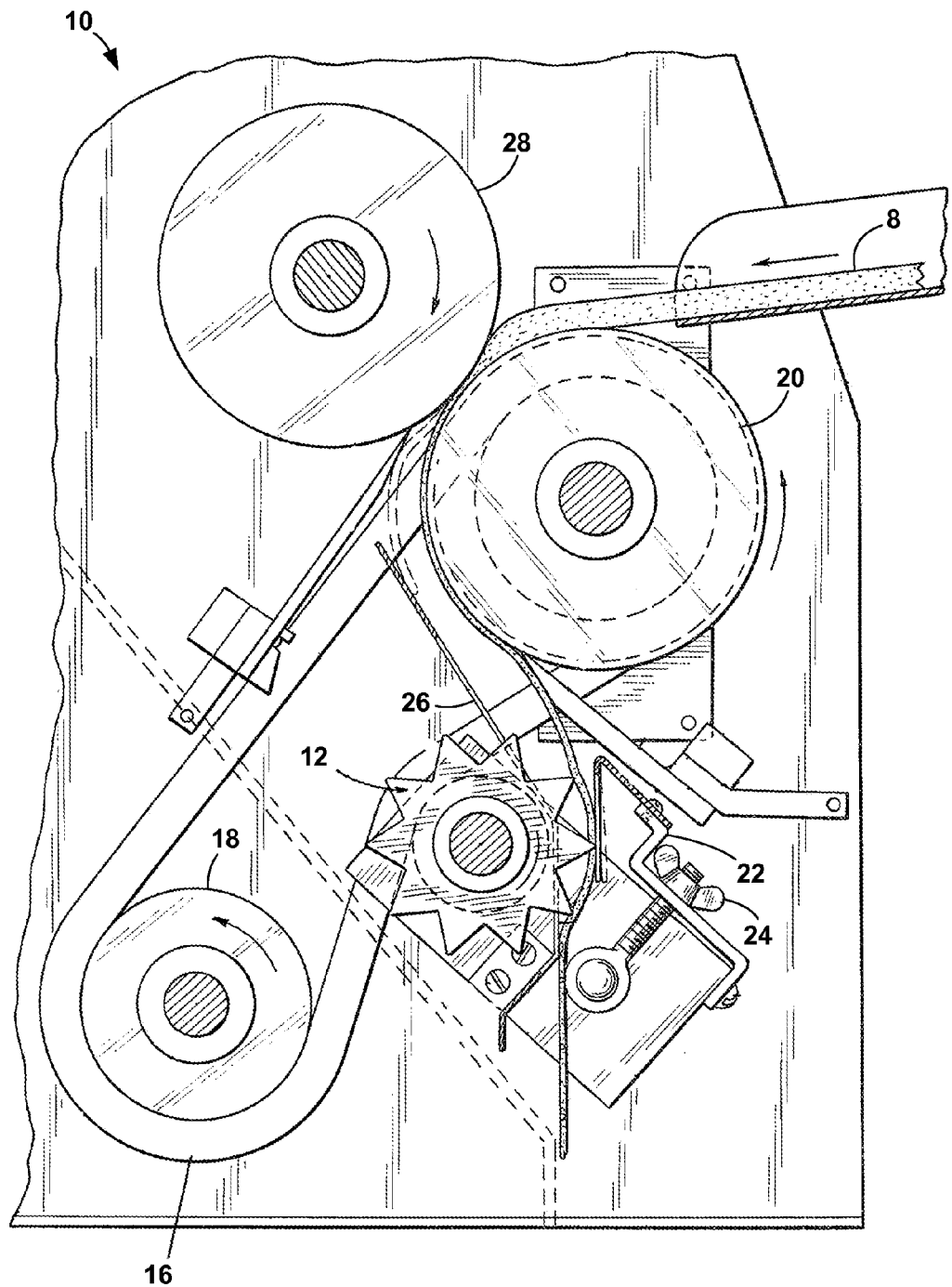
FIG. 1 is a side view of a sheeter incorporating a dough docker of the prior art.

FIG. 1 shows a dough sheeter 10 that incorporates a dough docker 12 as disclosed in U.S. Pat. No. 4,395,216, incorporated in its entirety herein by reference.

The motor 18 drives a chain or belt 16 that rotates the drive roller 20. The dough 8 is pulled between the sheeter drive roller 20 and idler roller 28. The sheeted dough travels between the grate 26 and the backer 22, where the docker 12 docks the dough.

The docker 12 is driven by the same motor 18 and chain or belt 16 as the sheeter drive roller 20. The docker 12 always rotates at the same speed relative to the drive roller 20. Also, because of the design of the backer 22, adjustment of the gap between the grate 26 and backer 22, which controls the depth of penetration of the dough docker, cannot be performed in an interactive manner. Access to the adjustment screw 24 is difficult. Additionally, the docker is built into the machine, making cleaning difficult.

The present invention is a dough sheeter with an integral dough docker in two embodiments. The first embodiment 30 is shown in FIGS. 2-4, has several improvements over the prior art.

Figure 2:
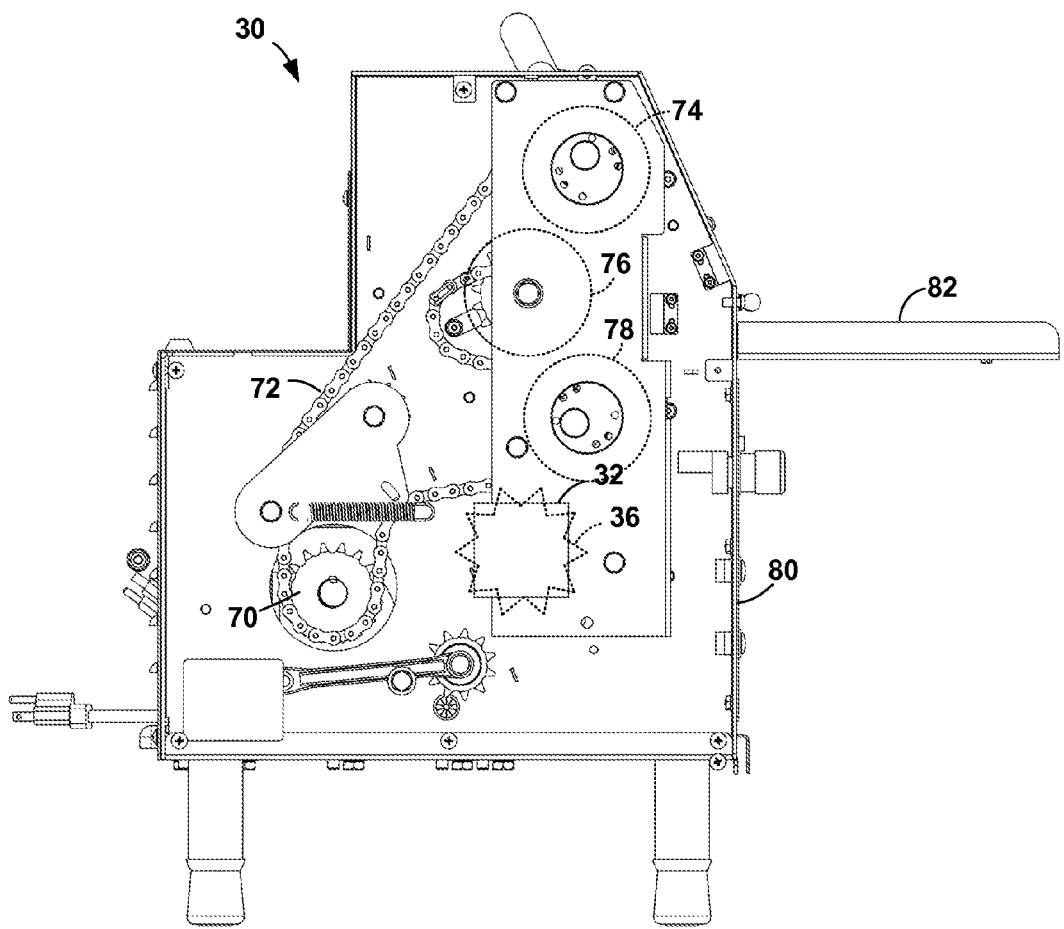
FIG. 2 is a side view of the first embodiment of the sheeter of the present invention showing the independent docker drive.

In the first improvement, shown in FIG. 2, the drive mechanism for the sheeter rollers 74, 76, 78 and the docker roller 34 are separate. The sheeter motor 70 drives the chain or belt 72 that rotates only the sheeter rollers 74, 76, 78. A separate motor 32 directly drives the docker roller 34. The speed of the docker motor 32 can be adjusted independently of the speed of the sheeter motor 70 via a control on the sheeter panel 80.

Figure 3:
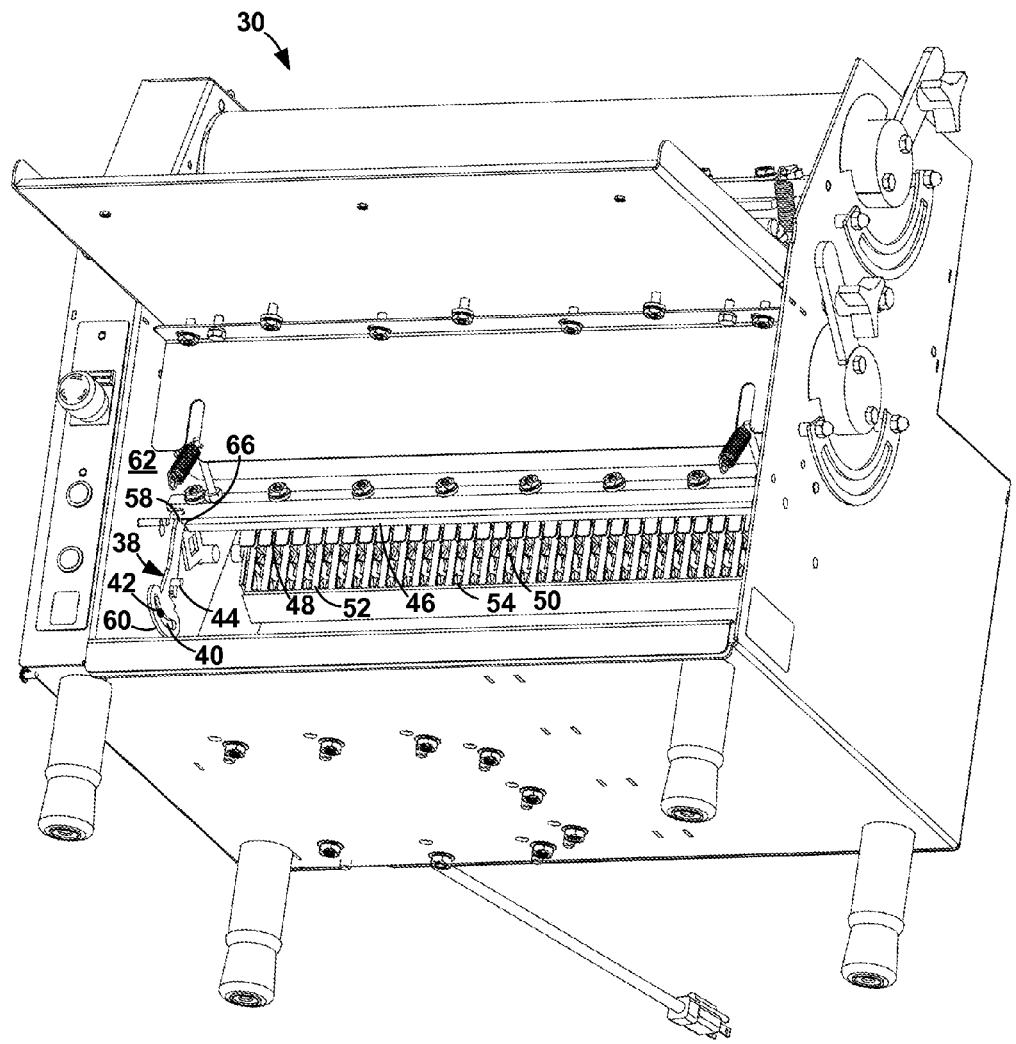
FIG. 3 is a perspective view of a sheeter of FIG. 2 showing the docker depth adjustment.
Figure 4:
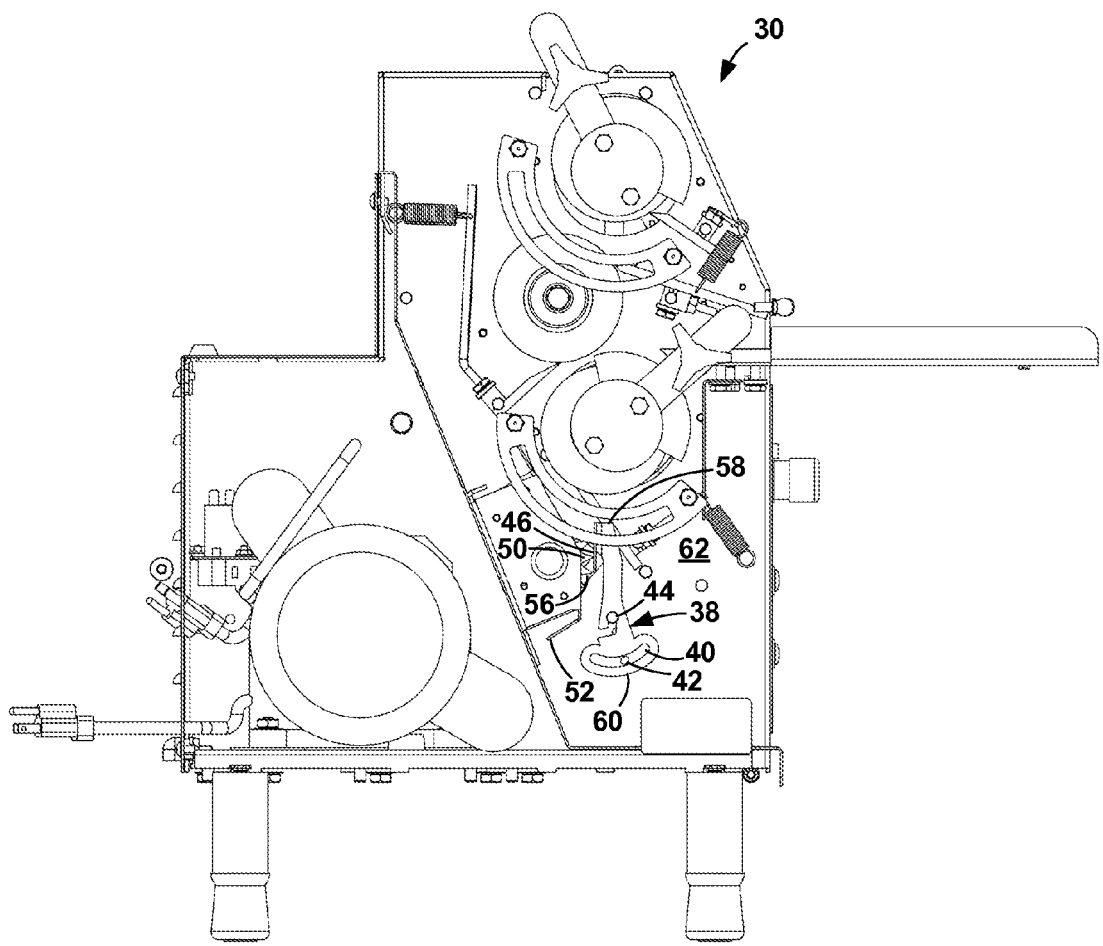
FIG. 4 is a side view of a sheeter of FIG. 2 showing the docker depth adjustment.
Figure 5:
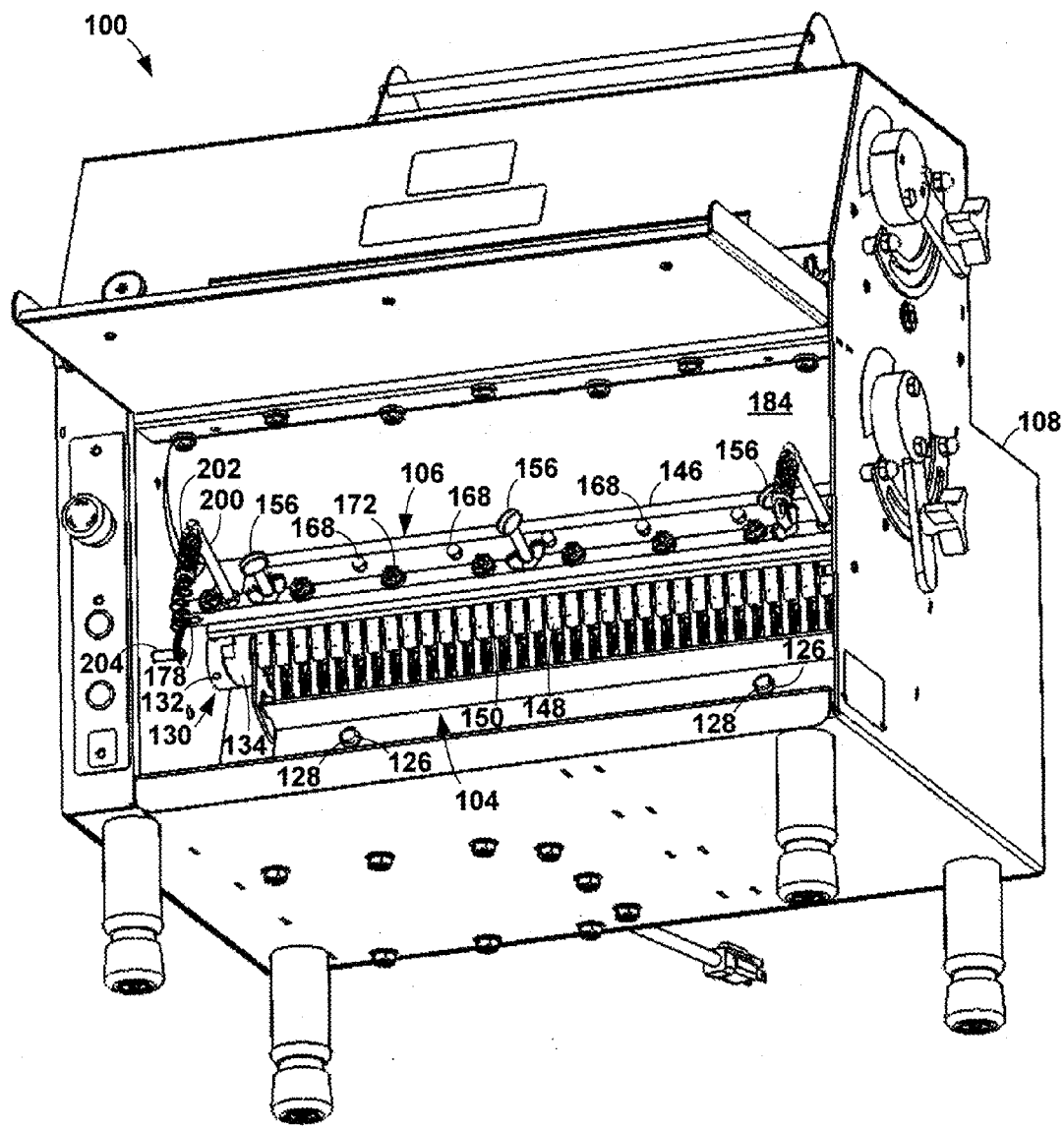
FIG. 5 is a perspective view of the second embodiment of the sheeter of the present invention showing the dough docker assembly.

The second improvement, shown in FIGS. 3 and 4, facilitates easy adjustment of the depth of penetration of the dough docker 34. In operation, the sheeter motor 70, via the chain 72, drives the upper and middle sheeter rollers 74, 76 that draw the dough into a thick sheet and deposits it on the tray 82. The operator then pushes the dough back into the sheeter 30 between the middle and lower sheeter rollers 76, 78 to thin the sheet. After leaving the rollers 76, 78, the dough travels between the docker grate 52 and the backer 46 through the gap 56. The docker pins 50, extending radially from the docker wheels 36, extend through slots 54 in the grate 52 and into the dough. If penetration is completely through the dough, the pins 50 may also extend into or through slots 48 in the backer 46. The depth of penetration is determined by the width of the gap 56 between the grate 52 and the backer 46.

Each end 66 of the backer 46 is mounted to one end 58 of a key 38 that pivots about a pivot point 44. The other end 60 of the key 38 includes a curved slot 40 on a pin 42 that extends from the sheeter housing 62. The pin 42 in the slot 40 limits how much the key 38 can pivot. The gap 56 is adjusted by pivoting the key 38. In FIG. 4, pivoting the key 38 clockwise makes the gap 56 smaller and, conversely, pivoting the key 38 counterclockwise makes the gap 56 larger. Optionally, the pin 42 includes a threaded rod with a threaded nut, such as a wing nut, for finger tightening.

The width of the gap 56 is easy to adjust and can be adjusted on the fly.

The second embodiment 100 is shown in FIGS. 5-11. In this embodiment 100, the dough docker is in an assembly 102 that is removable from the sheeter housing 108. The assembly 102 includes a docker subassembly 104 and a scraper subassembly 106.

Figure 6:
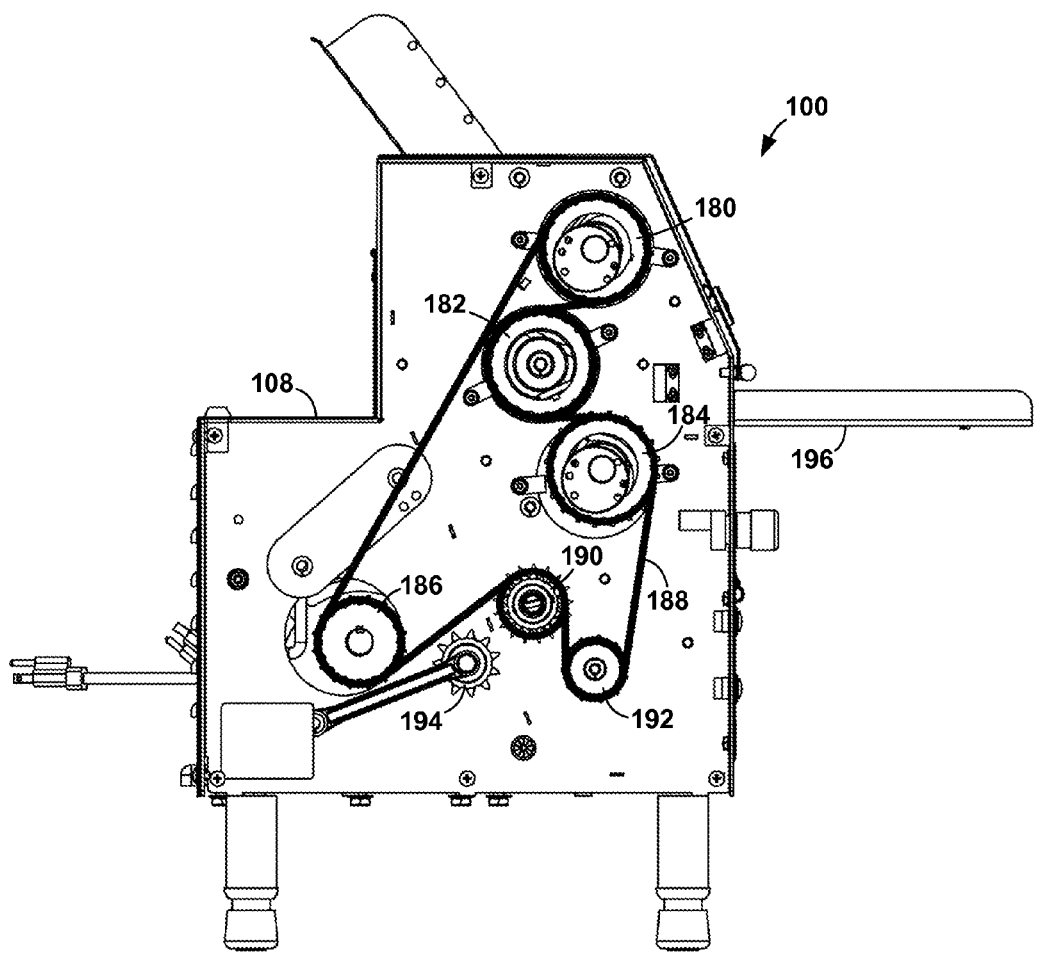
FIG. 6 is a side view of the sheeter of FIG. 5 showing the drive mechanism.
Figure 10:
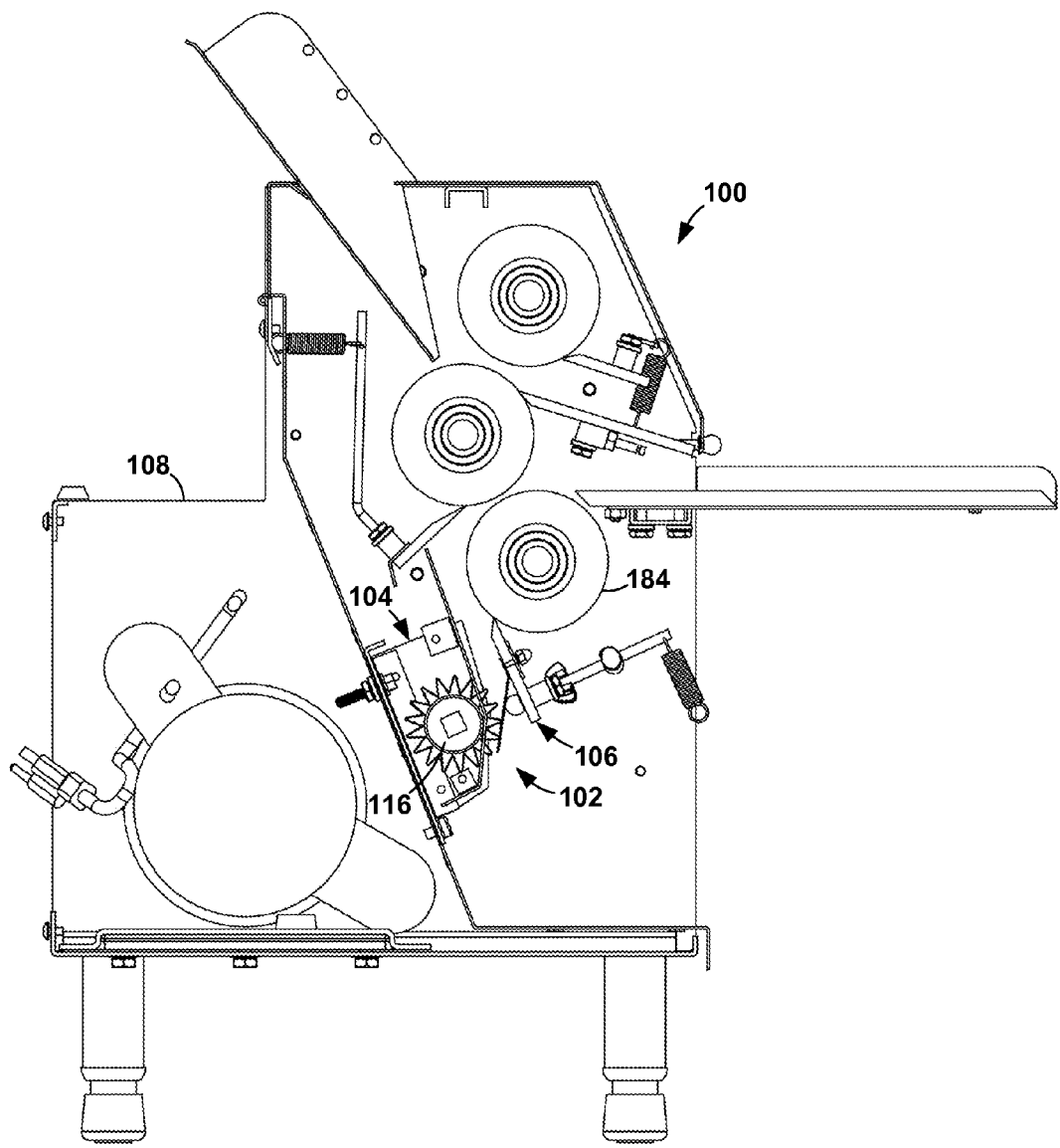
FIG. 10 is a side view of a sheeter of FIG. 5 showing the docker assembly.
Figure 11:
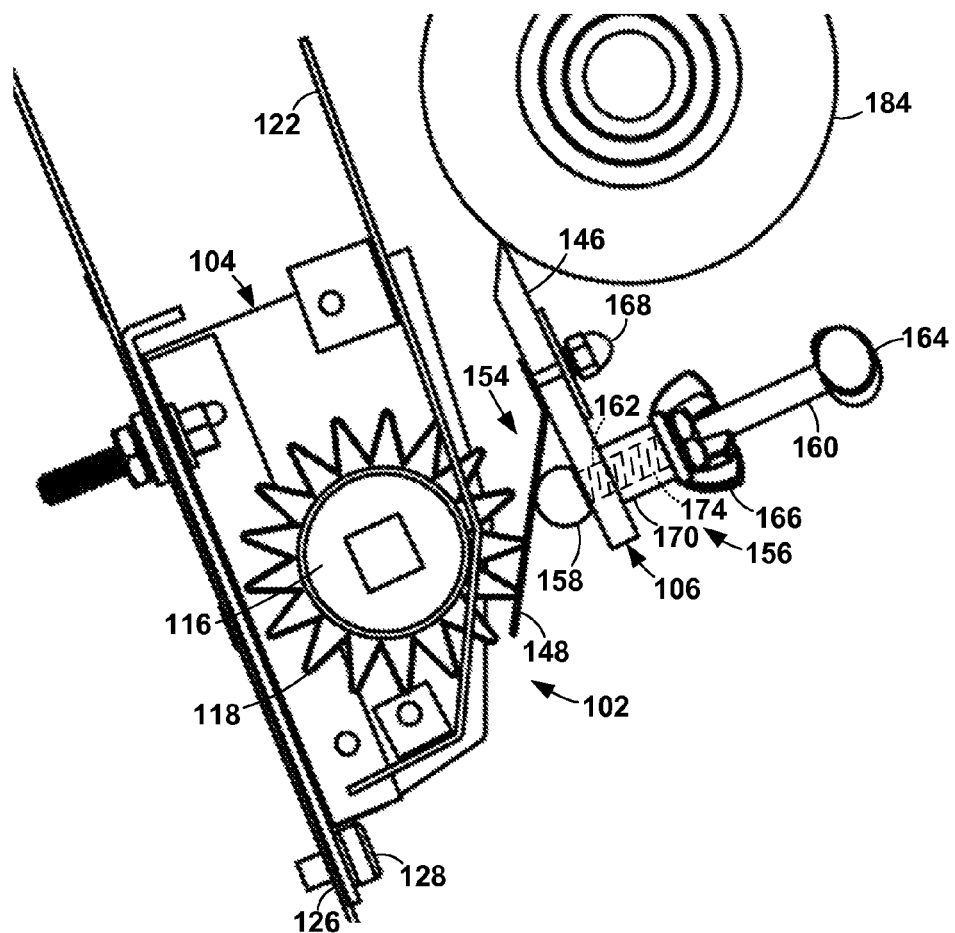
FIG. 11 is a close-up view of the docker assembly of FIG. 10.

As shown in FIG. 6, the sheeter 100 is driven by a motor 186 that powers a belt/chain 188. The chain or belt (referred to hereinafter as a "chain") drives three sheeter rollers 180, 182, 184 and a docker sprocket 190. An idler sprocket 192 and a tensioner 194 complete the drive mechanism. As with the first embodiment, the sheeter motor 186, via the chain 188, drives the upper and middle sheeter rollers 180, 182 that draw the dough into a thick sheet and deposits it on the tray 196. The operator then pushes the dough back into the sheeter 100 between the middle and lower sheeter rollers 182, 184 to thin the dough sheet. After leaving the rollers 182, 184, the dough travels between the docker grate 122 and the backer 148 through the gap 154.

The docker subassembly 104, shown in FIGS. 7-9 and 11, includes the docker roller 114 and the grate 122. The docker roller 114 has a plurality of docker wheels 116. Each of the docker wheels 116 has a plurality of docker pins 118 around its circumference. The grate 122 includes plurality of parallel slots 124 that are aligned with the docker wheels 116. The docker pins 118 from each wheel 116 extend through the corresponding slot 124.

The subassembly 104 is mounted to the sheeter 100 by a pair of screws 128 through holes 126 in the grate 122. The screws 128 can be finger-operated to facilitate easy removal.

The drive mechanism 130 for the docker roller 114 includes two disks 132, 134. The drive disk 132 is mounted to rotate with the docker sprocket 190. The docker disk 134 is mounted to the end of the docker roller 114 so that when the docker disk 134 rotates, the docker roller 114 rotates. The free end 136 of each of the disks 132, 134 has a pair of opposed, half-spiral surfaces 138 with shoulders 140. The docker subassembly 104 is installed by placing it into the sheeter 130 to the right of the drive disk 132 and moving the docker subassembly 104 to the left. As the docker disk 134 reaches the drive disk 132, the spiral surfaces 138 of the two disks 132, 134 touch. As the docker subassembly 104 is moved further left, the spiral surfaces 138 slide on each other, causing the docker roller 114 to rotate a bit, until the shoulders 140 of the two disks 132, 134 come into contact. At this point, the docker subassembly 104 is correctly positioned and the mounting screws 128 can be installed.

The scraper subassembly 106 includes the third roller scraper 146, the backer 148, and the gap adjuster 156. The backer 148 is attached to the scraper 146 by screw/nut combinations 168. The gap adjuster 156 includes a semicircular shaft 158 that abuts the backer 148 and extends the length of the backer 148. A rectangular shaft 170 is attached to the scraper 146 by screw/nut combinations 172. A threaded rod 160 extends from the semicircular shaft 158 through a hole 162 in the scraper 148 and a threaded hole 174 in the rectangular shaft 170. A finger grip 164 at the end of the threaded rod 160 allows the user to adjust the width of the gap 154 by turning the rod 160 in or out of the threaded hole 174. A lock nut 166 is tightened to lock the threaded rod 160 in the set position. Preferably, there is more than one gap adjuster 156. In the illustrated embodiment of FIGS. 5 and 7, there are three gap adjusters 156.

At the ends of the rectangular shaft 170 are a pair of inverted-U shaped grooves 176. To mount the scraper subassembly 106 to the housing 108, the grooves 176 fit over corresponding pins 178 that extend from the housing 108. Springs 202 extending between rods 200 attached to the rectangular shaft 170 and pins 204 extending from the housing 108 bias the scraper 146 against the bottom sheeter roller 184.

Since certain changes may be made in the present disclosure without departing from the scope of the present invention, it is intended that all matter described in the foregoing specification and shown in the accompanying drawings be interpreted as illustrative and not in a limiting sense.

What is claimed is:

1. A dough sheeter comprising:
(a) a housing;
(b) a top sheeter roller and a bottom sheeter roller in said housing;
(c) a docker sprocket with a drive disk attached thereto in said housing;
(d) a sheeter motor in said housing driving said rollers via a chain or belt;
(e) a docker motor in said housing driving said docker sprocket;
(f) a docker subassembly removably installed in said housing and comprising (1) a docker roller having a plurality of docker pins extending radially in circles from the circumference thereof; (2) a grate having a plurality of grate slots, each of said grate slots aligned with a circle of said docker pins such that said circle of docker pins extends through said grate slot; and (3) a docker disk axially attached to said docker roller, said docker disk mating with said drive disk only when said docker subassembly is installed in said housing such that, when said motor drives said docker sprocket, said drive disk meshes with said docker disk to rotate said docker roller;
(g) a scraper subassembly removably installed in said housing and comprising (1) a scraper biased against said bottom roller; (2) a backer attached to said scraper, said backer having backer slots aligned with said grate slots; and (3) a gap adjuster; and
(h) a gap formed between said grate and said backer through which said docker pins extend.

2. The dough sheeter of claim 1 wherein said gap adjuster includes a semicircular shaft between said scraper and said backer, a rectangular shaft attached to said scraper, and a threaded rod extending from said semicircular shaft, through a hole in said scraper, and through a threaded hole in said rectangular shaft to a finger grip, whereby turning said finger grip adjusts the width of said gap.

3. The dough sheeter of claim 1 wherein said docker roller is comprised of a plurality of coaxial docker wheels and wherein each of said docker wheels has one of said circles of docker pins, each of said docker wheels being aligned with one of said grate slots.

4. The dough sheeter of claim 1 wherein said sheeter motor and said docker motor are the same motor and said docker sprocket is driven by said chain or belt.

5. The dough sheeter of claim 1 wherein said sheeter motor and said docker motor are separate motors.

* * * * *